(12) United States Patent
Putnam

(10) Patent No.: US 7,025,536 B2
(45) Date of Patent: Apr. 11, 2006

(54) TANDEM APPARATUS FOR BURSTING AND REPLACING PIPE

(76) Inventor: Samuel W. Putnam, 305 Darbonne Dr., West Monroe, LA (US) 71291

( * ) Notice: Subject to any disclaimer, the term of this patent is extended or adjusted under 35 U.S.C. 154(b) by 0 days.

(21) Appl. No.: 10/869,361

(22) Filed: Jun. 16, 2004

(65) Prior Publication Data

US 2004/0265067 A1 Dec. 30, 2004

Related U.S. Application Data

(60) Provisional application No. 60/480,699, filed on Jun. 24, 2003.

(51) Int. Cl.
*F16L 55/18* (2006.01)
(52) U.S. Cl. .................. 405/184.3; 254/29 R
(58) Field of Classification Search ............... 405/156, 405/184.3, 184.1, 184; 254/29 R, 30, 31
See application file for complete search history.

(56) References Cited

U.S. PATENT DOCUMENTS

| | | | |
|---|---|---|---|
| 2,044,483 A | 6/1936 | Neher | 254/71 |
| 2,126,933 A | 8/1938 | Stone et al. | 255/1 |
| 2,889,135 A | 6/1959 | Tennyck | 254/29 |
| 2,939,739 A | 6/1960 | Grunsky | 294/96 |
| 3,094,312 A | 6/1963 | Woolgar | 254/29 |
| 3,266,776 A | 8/1966 | Catu | 254/135 |
| 3,787,950 A | 1/1974 | Bagby | 29/237 |
| 3,834,668 A | 9/1974 | Casey | 254/29 |
| 3,998,428 A | 12/1976 | Miles | 254/29 |
| 4,030,183 A | 6/1977 | Smola | 29/252 |
| 4,318,835 A | 3/1982 | Clarke | 264/36 |
| 4,448,393 A | 5/1984 | Habegger et al. | 254/264 |
| 4,456,226 A | 6/1984 | Stumpmeier | 254/264 |
| 4,457,647 A | 7/1984 | Dusette et al. | 405/154 |
| 4,571,802 A | 2/1986 | Calhoun | 29/157.3 R |

(Continued)

FOREIGN PATENT DOCUMENTS

JP 57131672 A * 8/1982

*Primary Examiner*—Michael Safavi
*Assistant Examiner*—Gay Ann Spahn
(74) *Attorney, Agent, or Firm*—John M. Harrison

(57) ABSTRACT

A tandem rod or cable apparatus for bursting and replacing pipe, which includes a frame, two sets of oppositely-disposed hydraulic cylinders having piston rods, each of which pairs of piston rods are attached to a yoke, with a gripping element provided in each yoke for independently gripping a rod or cable extending through the aligned gripping elements. One end of the rod or cable is attached to a bursting and stored energy head and the other end extends through the gripping elements, typically to a reel (in the case of a cable) for taking up slack in the cable. Advancement of the bursting and stored energy head through a defective pipe to be burst and typical simultaneous replacement with an attached replacement pipe is effected by operation of the two sets of hydraulic cylinders and the corresponding gripping elements to push or pull the rod or pull the cable. In a preferred embodiment a pneumatic hammer is typically seated in the bursting and stored energy head and operates in cooperation with a pair of springs to optimize bursting of the defective pipe as the pneumatic hammer repeatedly strikes the bursting and stored energy head. The combined actions of the rod or cable operating hydraulic cylinders and the hammer cause the bursting and stored energy head to progressively rupture the defective pipe and typically draw the replacement pipe into position.

18 Claims, 8 Drawing Sheets

U.S. PATENT DOCUMENTS

| | | | |
|---|---|---|---|
| 4,576,254 A * | 3/1986 | Cox | 188/67 |
| 4,593,884 A | 6/1986 | Zschocke et al. | 254/264 |
| 4,615,509 A | 10/1986 | Biass | 254/264 |
| 4,634,101 A | 1/1987 | Lauber | 254/228 |
| 4,634,313 A | 1/1987 | Robbins | 405/184 |
| 4,648,746 A | 3/1987 | Abinett | 405/184 |
| 4,685,831 A | 8/1987 | Mahoney | 405/156 |
| 4,693,404 A | 9/1987 | Wayman et al. | 225/103 |
| 4,732,222 A | 3/1988 | Schmidt | 175/22 |
| 4,738,565 A | 4/1988 | Streatfield et al. | 405/154 |
| 5,013,188 A | 5/1991 | Campbell et al. | 405/184 |
| 5,112,070 A | 5/1992 | Hahn | 280/79.4 |
| 5,127,481 A | 7/1992 | Hesse | 175/295 |
| 5,171,106 A | 12/1992 | Rockower et al. | 405/156 |
| 5,173,009 A | 12/1992 | Moriarty | 405/154 |
| 5,192,165 A | 3/1993 | Torielli | 405/156 |
| 5,205,671 A | 4/1993 | Handford | 405/154 |
| 5,207,533 A | 5/1993 | Federspiel et al. | 405/156 |
| 5,208,967 A | 5/1993 | Beard | 29/726 |
| 5,277,406 A | 1/1994 | Knight | 254/228 |
| 5,302,053 A | 4/1994 | Moriarty | 405/154 |
| 5,306,101 A | 4/1994 | Rockower et al. | 405/154 |
| 5,328,297 A | 7/1994 | Handford | 405/184 |
| 5,403,122 A | 4/1995 | Granella | 405/184 |
| 5,439,320 A * | 8/1995 | Abrams | 405/184.3 |
| 5,482,404 A | 1/1996 | Tenbusch, II | 405/184 |
| 5,580,188 A | 12/1996 | Nowak | 405/184 |
| 5,642,912 A | 7/1997 | Parish, II | 294/86.12 |
| 5,709,503 A | 1/1998 | Manlow | 405/154 |
| 5,749,677 A | 5/1998 | Grigoraschenko | 405/184 |
| 5,782,311 A | 7/1998 | Wentworth | 175/53 |
| 5,785,458 A | 7/1998 | Handford | 405/184 |
| 6,092,553 A | 7/2000 | Hodgson | 138/97 |
| 6,109,832 A | 8/2000 | Lincoln | 405/184 |
| 6,129,486 A * | 10/2000 | Putnam | 405/184 |
| 6,244,783 B1 | 6/2001 | Puttmann et al. | 405/184 |
| 6,357,967 B1 * | 3/2002 | Putnam | 405/184.3 |

* cited by examiner

TANDEM APPARATUS FOR BURSTING AND REPLACING PIPE

CROSS-REFERENCE TO RELATED APPLICATIONS

This application is related to my co-pending application Ser. Nos. 10/021,587, filed Dec. 12, 2001 and Ser. No. 10/234,216, filed Sep. 4, 2002, now U.S. Pat. No. 6,672,802. This application also claims the benefit of and incorporates by reference prior filed U.S. Provisional Application Ser. No. 60/480,699, filed Jun. 24, 2003.

SUMMARY OF THE INVENTION

This invention includes a new and improved device for replacing a defective underground gas, water, sewer or other utility pipe by progressively cutting and bursting the pipe and typically simultaneously drawing a replacement pipe into position behind the migrating burst point of the pipe being replaced. In a preferred embodiment the apparatus of this invention is characterized by a specially designed rod or cable pulling hydraulic tandem device or apparatus which is typically fitted with two pairs of oppositely-disposed, double-action hydraulic rod or cable driving members or cylinders, each attached to a separate yoke having oppositely-disposed, aligned rod-gripping elements. The rod or cable pulling device is typically vertically or horizontally situated in a manhole or in an excavation at one end of a defective pipe to be replaced. A pull rod or cable is extended through the aligned rod driving gripping members mounted on the rod or cable pulling device yokes and through the defective pipe and is attached in a preferred embodiment to a stored energy housing connected to a tapered bursting head (hereinafter called bursting and stored energy head), typically fitted with multiple blades which initially engage the opposite end of the pipe to be broken. A pneumatic hammer is typically spring-biased in the stored energy housing and a replacement pipe is typically removably attached to the bursting head. In typical operation the aligned gripping elements driven by the oppositely-disposed pairs of rod or cable driving members of the rod or cable pulling device repeatedly and alternately grip, pull (or push, in the case of a rod) and release the pull rod or cable and move to a new gripping position on the pull rod or cable. This action pulls (or pushes) the stored energy head element against the bursting head component and thus, the bursting head against the pipe to be replaced, as the pneumatic hammer repeatedly strikes the bursting and stored energy housing and forces the bursting head against the pipe.

The combined pulling or pushing action of the rod or cable pulling device and the driving action of the pneumatic hammer cause the bursting and stored energy head to migrate along the defective pipe and progressively cut and rupture the pipe and simultaneously draw the replacement pipe into position behind the migrating burst point of the old pipe. In a preferred embodiment a pair of springs fitted in the stored energy housing are compressed and biased to store energy and apply the energy against the bursting head element as the rod or cable pulling device pulls or pushes the rod or pulls the cable and moves the bursting and stored energy head. As the hammer strikes the stored energy element against the bursting head, tension released by the springs in the stored energy housing augments the driving action of the hammer and assists the rod or cable pulling device and hammer in forcing the bursting and stored energy head along the pipe. The pneumatic hammer is typically used in combination with the tandem apparatus, typically under circumstances in which valves, concrete encasements, timbers or other significant obstructions are likely to be encountered by the bursting and stored energy head in or around the pipe being split or burst and replaced. When such obstructions are unlikely to be encountered by the bursting and stored energy head, the rod or cable pulling device can be used without the pneumatic hammer to pull or push the pipe bursting and stored energy head along the pipe. The tandem apparatus of this invention can be horizontally oriented, typically in a trench or excavation, for direct pull or push in a substantially horizontal pipe bursting application or vertically positioned in a manhole for horizontal pipe bursting applications using a pulley and pull cable system.

BRIEF DESCRIPTION OF THE DRAWINGS

The invention will be better understood by reference to the accompanying drawings, wherein.

DESCRIPTION OF THE PREFERRED EMBODIMENTS

Figure 1:
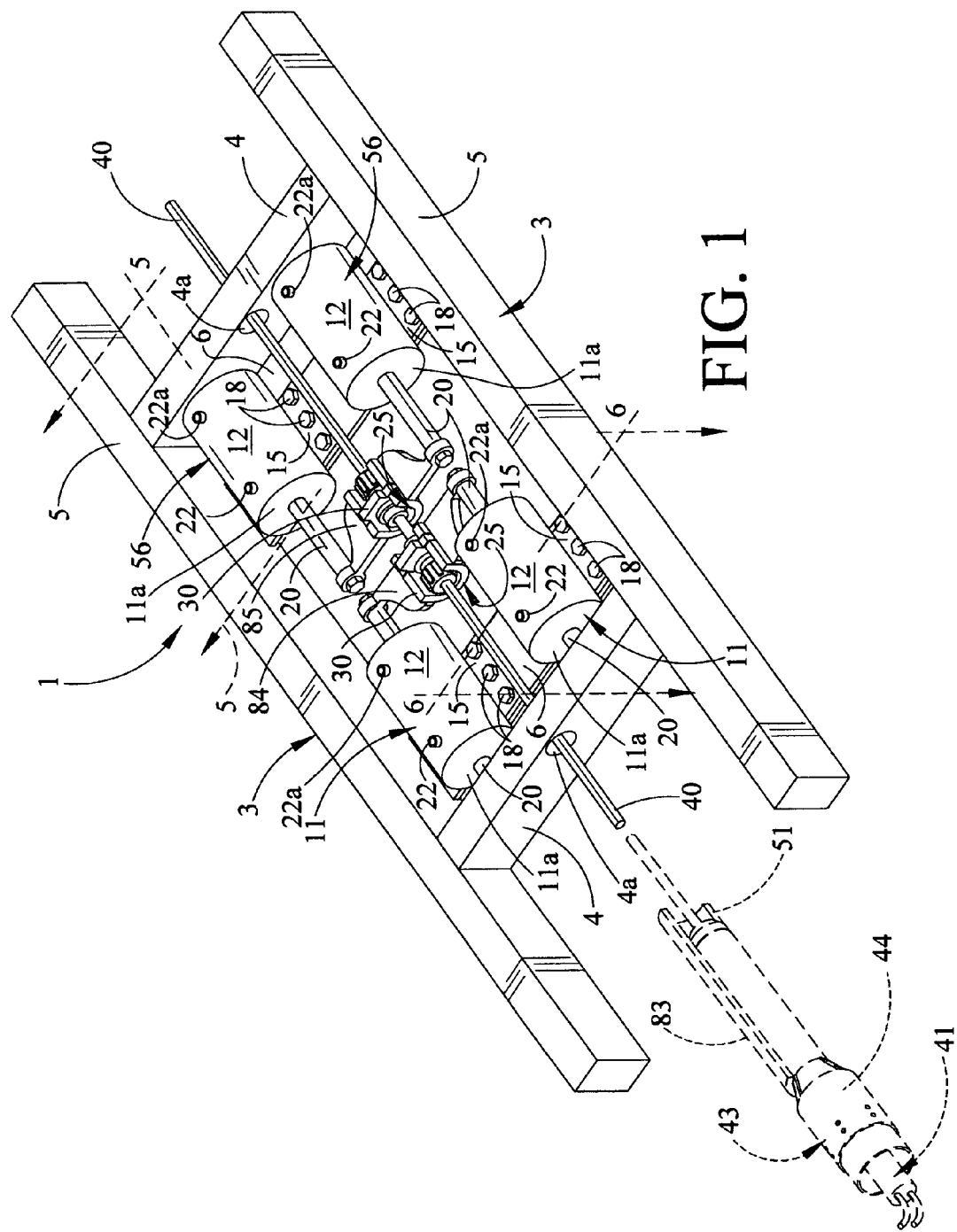
FIG. 1 is a perspective view of a preferred embodiment of the tandem apparatus of this invention, characterized by oppositely-disposed sets of tandem-oriented hydraulic cylinders disposed for pulling or pushing a rod or pulling a cable and forcing a bursting and stored energy head through a defective pipe.

Referring initially to FIGS. 1–3 and 5 of the drawings the tandem apparatus of this invention is generally illustrated by reference numeral 1. The tandem apparatus 1 is characterized by a frame 3, which is typically shaped by cylinder mounts 6 and end frame members 4, spanning side frame members 5, as illustrated. A pair of front rod driving members 11 include a pair of parallel hydraulic cylinders 12, each having a front end 11a and cylinder mount flanges 15, secured to one of the cylinder mounts 6 of the frame 3, typically using mount bolts 18, as illustrated. A pair of rear rod driving members 56 are disposed opposite the front rod driving members 11 in the frame 3 and include a second set of parallel hydraulic cylinders 12, mounted to the second cylinder mount 6 using additional mount bolts 18. Each of the four hydraulic cylinders 12 includes a piston 19 (FIG. 5), having a piston rod 20 which extends through the front end 11a of the front rod driving members 11 and the rear rod driving members 56, respectively. The piston rod 20 of the hydraulic cylinders 12 in the front rod driving members 11 are each connected to a common front yoke 84, which mounts a single gripping element 25, as further illustrated in FIG. 1. Similarly, the piston rods 20 of the hydraulic cylinders 12 in the rear rod driving members 56 are each connected to a common rear yoke 85, which mounts a second gripping element 25. It will be appreciated from a consideration of FIGS. 1–3 that the gripping elements 25 are in alignment to receive a pull rod 40 or a pull cable (not illustrated), as desired. One end of the pull rod 40 is attached to the front end of a bursting and stored energy head 43, illustrated in phantom in FIG. 1. The opposite end of the pull rod 40 extends through aligned rod or cable openings 4a in the end frame members 4 (FIG. 1) and through the respective aligned gripping elements 25. In the case of a pull cable (not illustrated) the free end of the cable may be gathered on a cable take-up drum (not illustrated), as desired.

Figure 2:
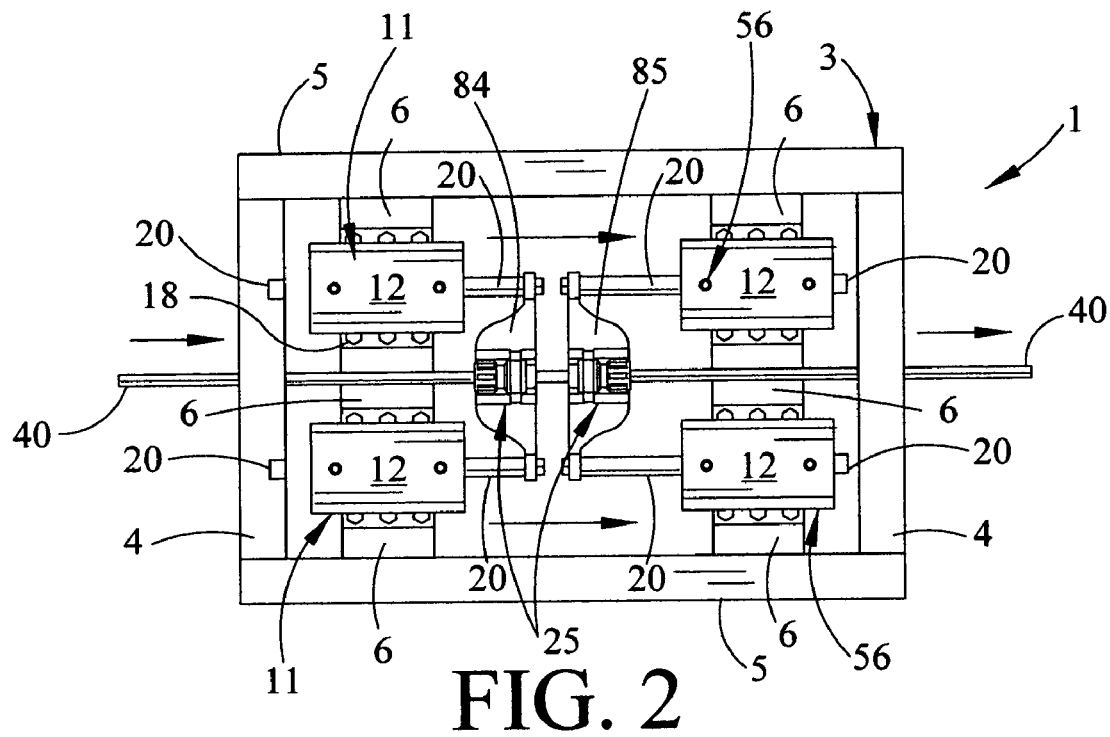
FIG. 2 is a top view of the tandem apparatus illustrated in FIG. 1 disposed in a first rod or cable operating mode.
Figure 3:
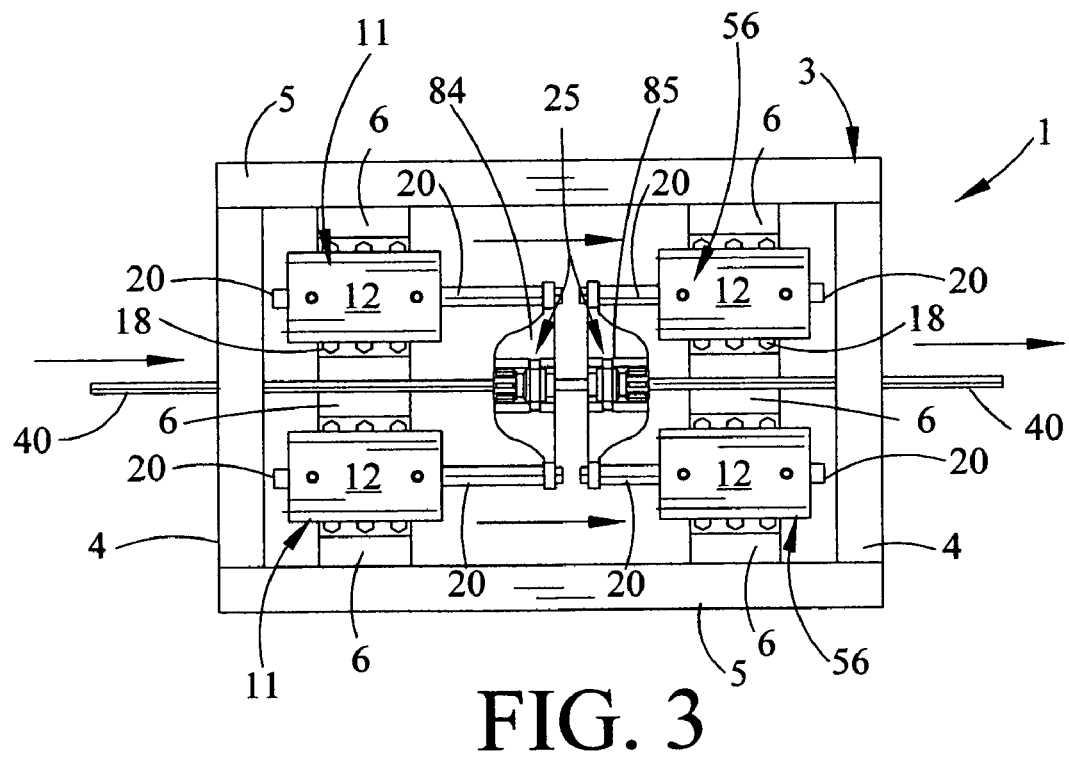
FIG. 3 is a top view of the tandem apparatus illustrated in FIG. 1 disposed in a second rod or cable operating mode.
Figure 8:
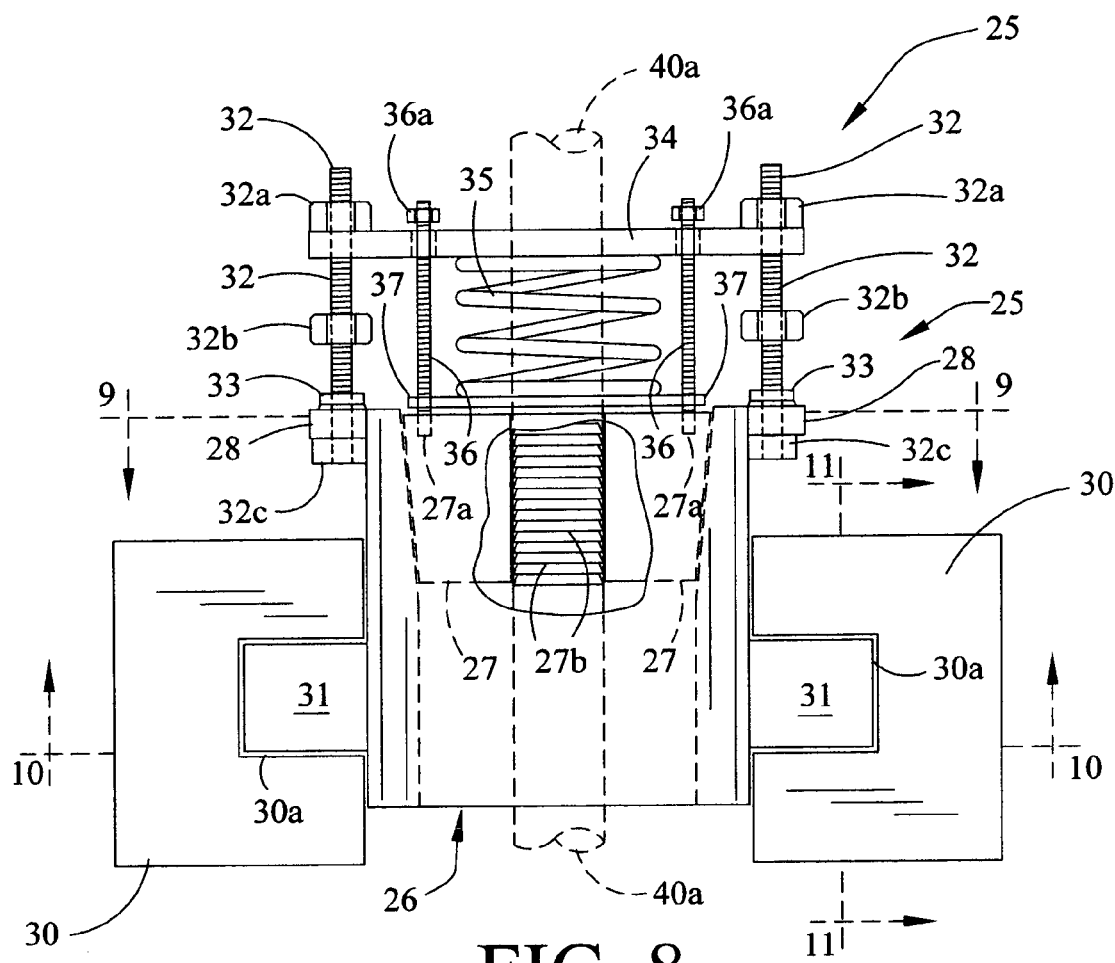
FIG. 8 is a top view, partially in section, of a first preferred gripping element for mounting on each one of a pair of yokes attached to each of the oppositely-disposed pairs of hydraulic cylinders illustrated in FIG. 1, for gripping the rod or cable during operation of the respective tandem pairs of hydraulic cylinders.
Figure 10:
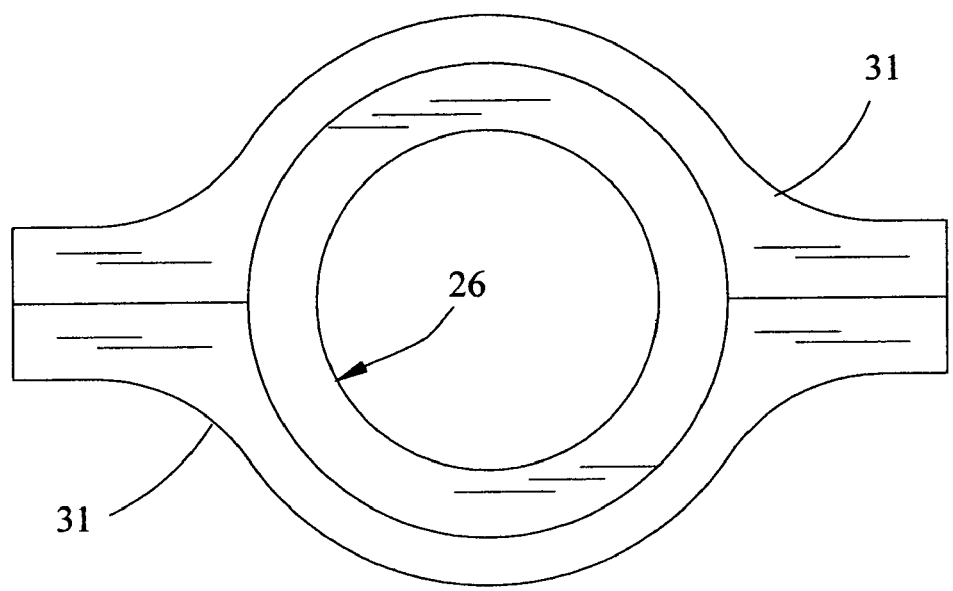
FIG. 10 is a sectional view taken line along 10—10 of the gripping element illustrated in FIGS. 8 and 12.
Figure 11:
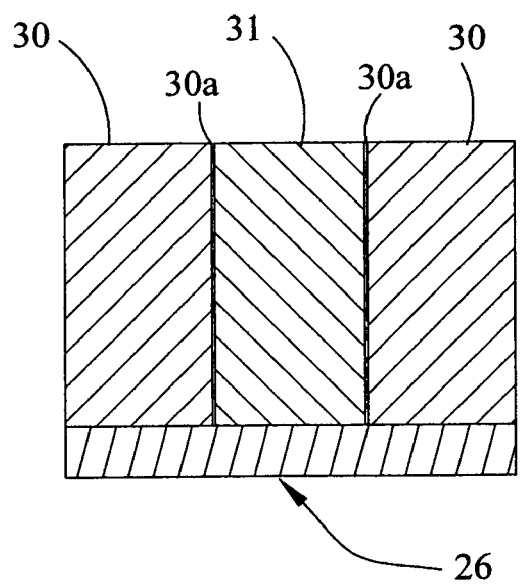
FIG. 11 is a sectional view taken along line 11—11 of the gripping element illustrated in FIGS. 8 and 12.
Figure 12:
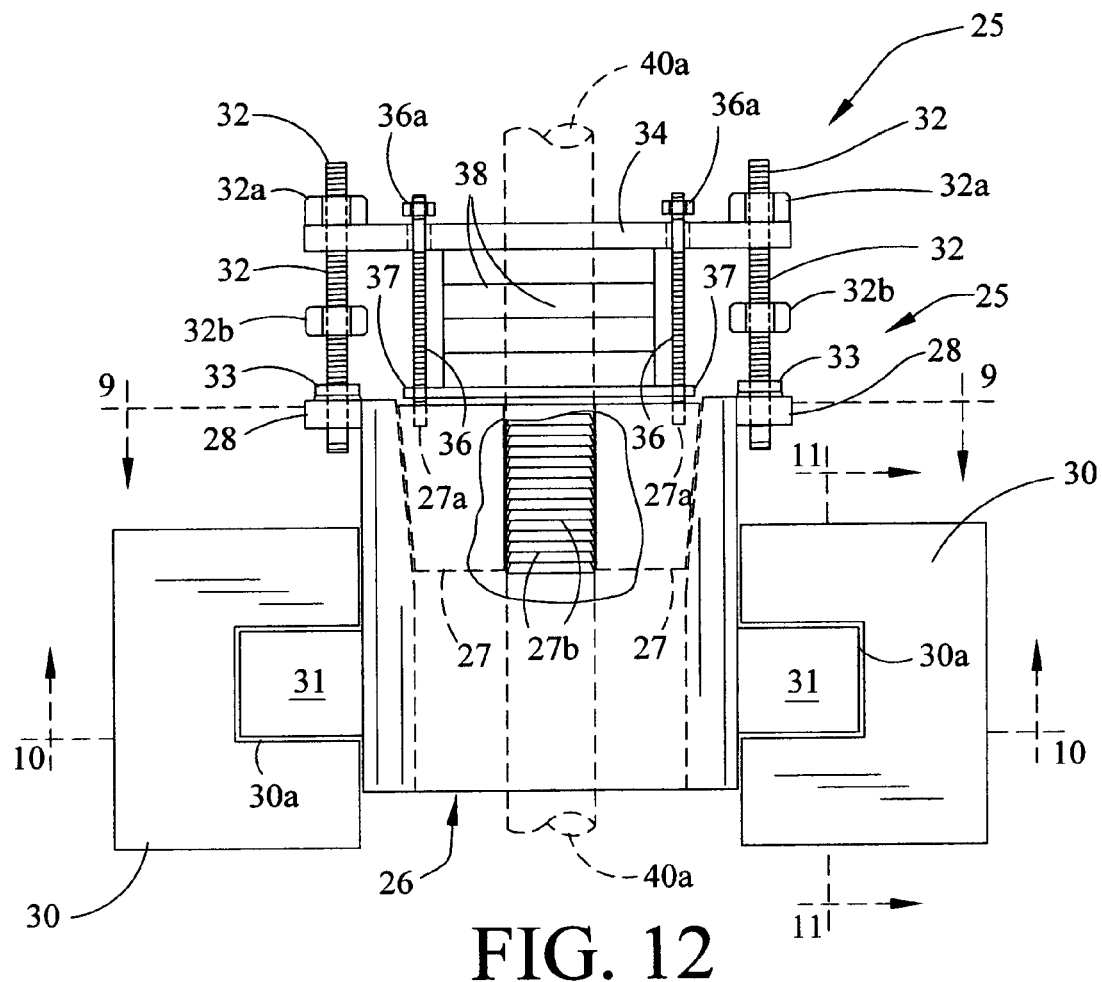
FIG. 12 is a top view, partially in section, of an alternative preferred gripping element.

Referring to FIGS. 2, 3 and 8–12 of the drawings, the tandem apparatus 1 is illustrated in alternating push or pull configurations. Referring initially to FIG. 2, the gripping element 25 which is attached to the front yoke 84 served by the parallel hydraulic cylinders 12 in the dual front rod driving members 11 is illustrated as engaging the pull rod 40, while the gripping element 25 mounted on the rear yoke 85 and served by the dual, parallel hydraulic cylinders 12 in the rear rod driving members 56, is released from the pull rod 40. As the parallel piston rods 20 in each of the hydraulic cylinders 12 of the front rod driving members 11 extend, the pull rod is advanced in the direction of the arrows in FIG. 2, throughout the full stroke of the piston rods 20. When this stroke is complete, the gripping element 25 in the front rod driving members 11 releases its grip from the pull rod 40 and the gripping element 25 in the rear rod driving members 56 grips the pull rod 40, as the piston rods 20 in the corresponding hydraulic cylinders 12 retract and continue the forward movement of the pull rod or cable 40 in the direction of the arrow, throughout the full stroke of the piston rods 20, as illustrated in FIG. 3. The sequence continues in order to advance the pull rod or cable 40 and pull or push the bursting head (not illustrated) through a pipe to be broken, as hereinafter further described. Sequential gripping of the rod 40 by the respective gripping elements 25 is effected by contact between the unidirectional teeth 27b shaped in the respective wedges 27, as illustrated in FIGS. 8 and 12 of the drawings. The respective sets of teeth 27b grip the rod 40 as each gripping element 25 is forced in the direction of the arrows in sequence by the respective hydraulic cylinders 12 as described above with respect to FIGS. 2 and 3 of the drawings. The degree of force applied by the teeth 27b on the rod 40 is determined by the tension in the gripping element spring 35 (FIG. 8) or the rubber washers 38 (FIG. 12). Reverse non-gripping movement of the respective gripping elements 25 on the pull rod 40 is facilitated since the rod 40 motion is opposite the unidirectional orientation of the respective teeth 27b in the corresponding wedges 27 (FIGS. 2, 3, 8 and 12).

Figure 4:
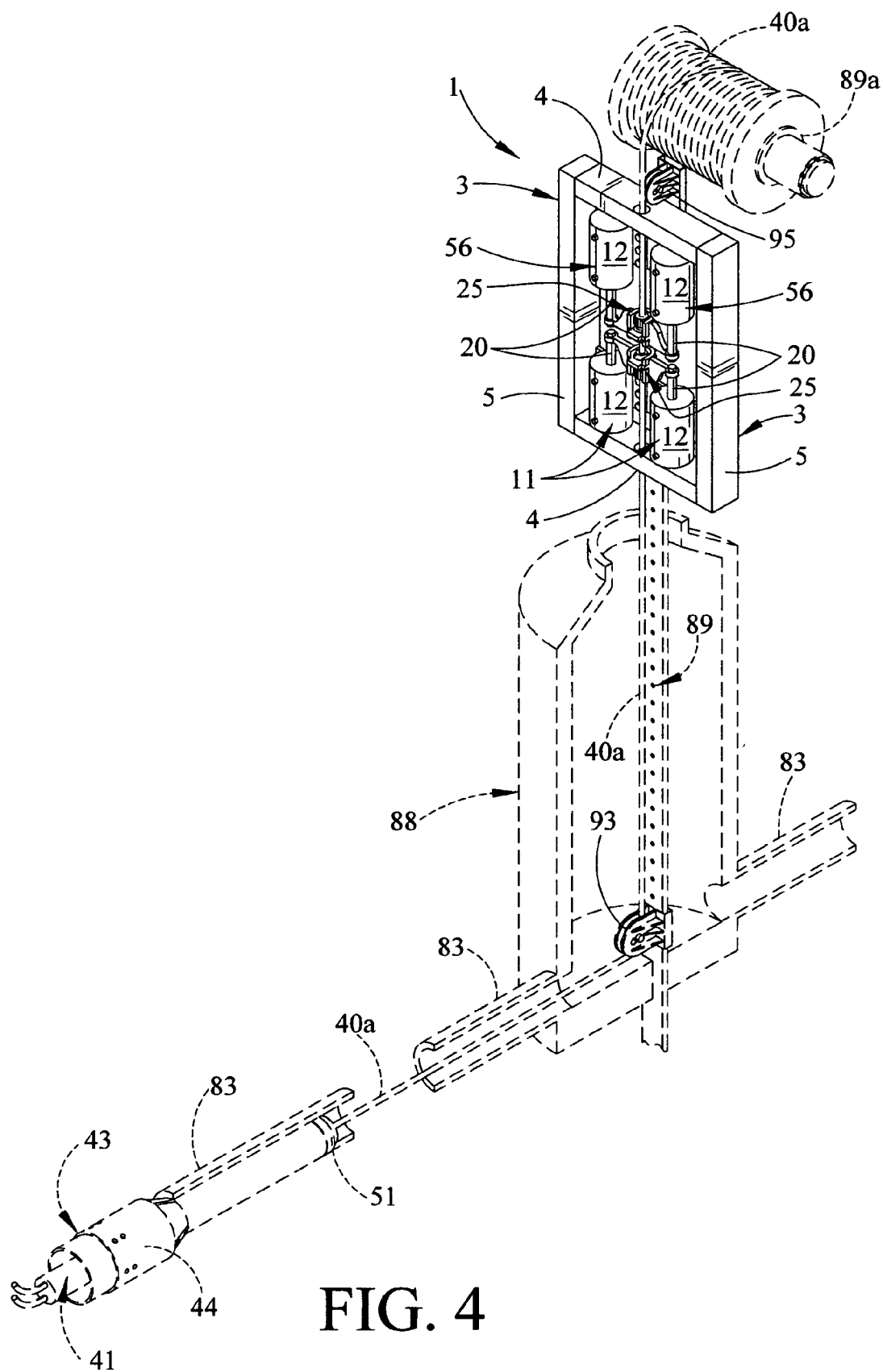
FIG. 4 is a perspective view of the tandem apparatus illustrated in FIG. 1 oriented in a vertical configuration above a manhole for pulling a cable attached to a pipe bursting device, wherein the cable is extended into the manhole and then directed horizontally from the manhole to the pipe bursting device by means of a pulley.

Referring now to FIG. 4 of the drawings it will be appreciated by those skilled in the art that the tandem apparatus 1 illustrated in FIG. 1 can be vertically oriented for operation in a manhole structure 88, (illustrated in phantom) typically in the orientation detailed in my U.S. patent application Ser. No. 10/234,216, filed Sep. 4, 2002, now U.S. Pat. No. 6,672,802. Accordingly, the frame 3 can be attached to the vertically-oriented pulley mount 89 (illustrated in phantom) that is inserted in the base or bottom of the manhole structure 88 and the apparatus includes a bottom pulley 93, secured to the pulley mount 89 at the bottom of the manhole structure 88. Accordingly, a pull cable 40a (illustrated in phantom) extends around the bottom pulley 93, horizontally to a bursting and stored energy head 43, also illustrated in phantom, and upwardly, parallel to the pulley mount 89, through the aligned gripping elements 25, to a cable drum 89a (illustrated in phantom) designed to take up the slack in the pull cable 40a during the operation of the vertically-oriented tandem apparatus 1. A top pulley 95 is fitted to the top end of the pulley mount 89 to align the pull cable 40a with the cable drum 89a, as further illustrated in FIG. 4. Accordingly, operation of the tandem apparatus 1 in the manner heretofore described with respect to FIGS. 2 and 3 and the pull rod 40, facilitates progressive extension of the pull cable 40a upwardly for spooling on the cable drum 89a and causes the bursting and stored energy head 43 to extend through and break the pipe 83. As further heretofore described, a hammer 41 (illustrated in phantom) is used in association with the bursting and stored energy head 43 and the tension in the pull cable 40a to advance the bursting and stored energy head 43 through the pipe 83 as the bursting and stored energy head 43 approaches the bottom of the manhole structure 88.

Figure 5:
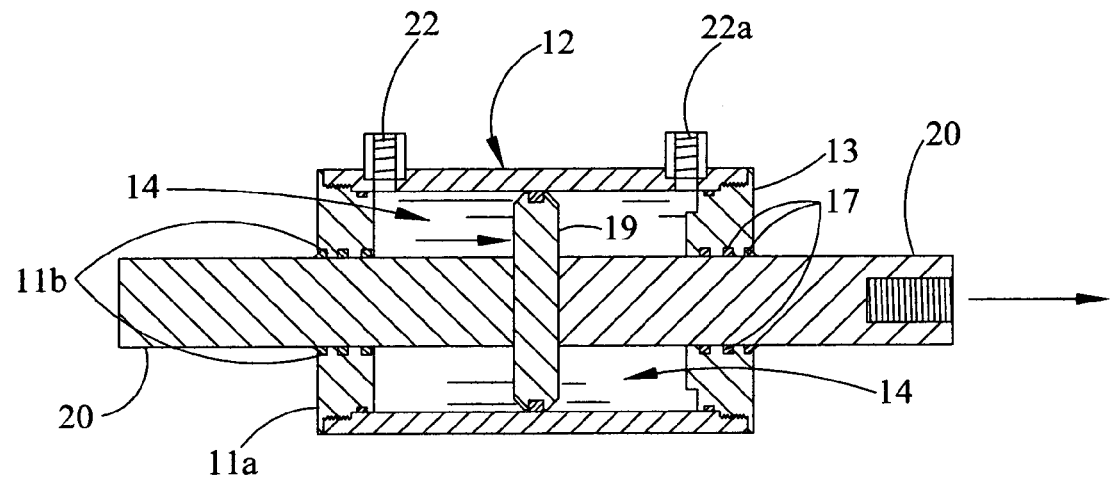
FIG. 5 is a side sectional view taken along line 5—5 of FIG. 1 of a typical hydraulic cylinder used in the tandem apparatus illustrated in FIG. 1, particularly illustrating operation of the hydraulic cylinder.
Figure 6:
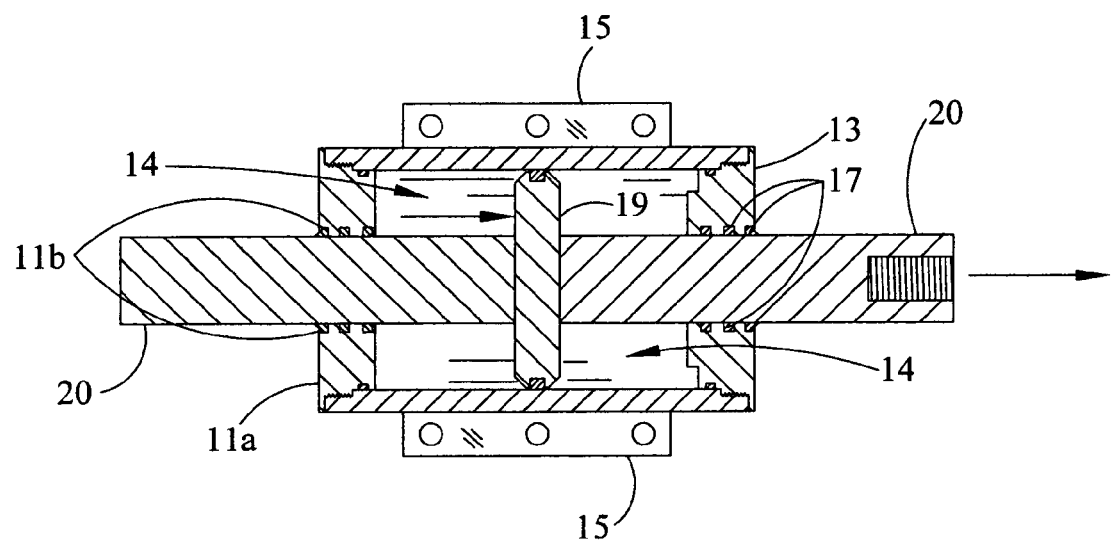
FIG. 6 is a top sectional view taken along line 5—5 of FIG. 1 of the hydraulic cylinder illustrated in FIG. 5, more particularly illustrating operation of the hydraulic cylinder.
Figure 7:
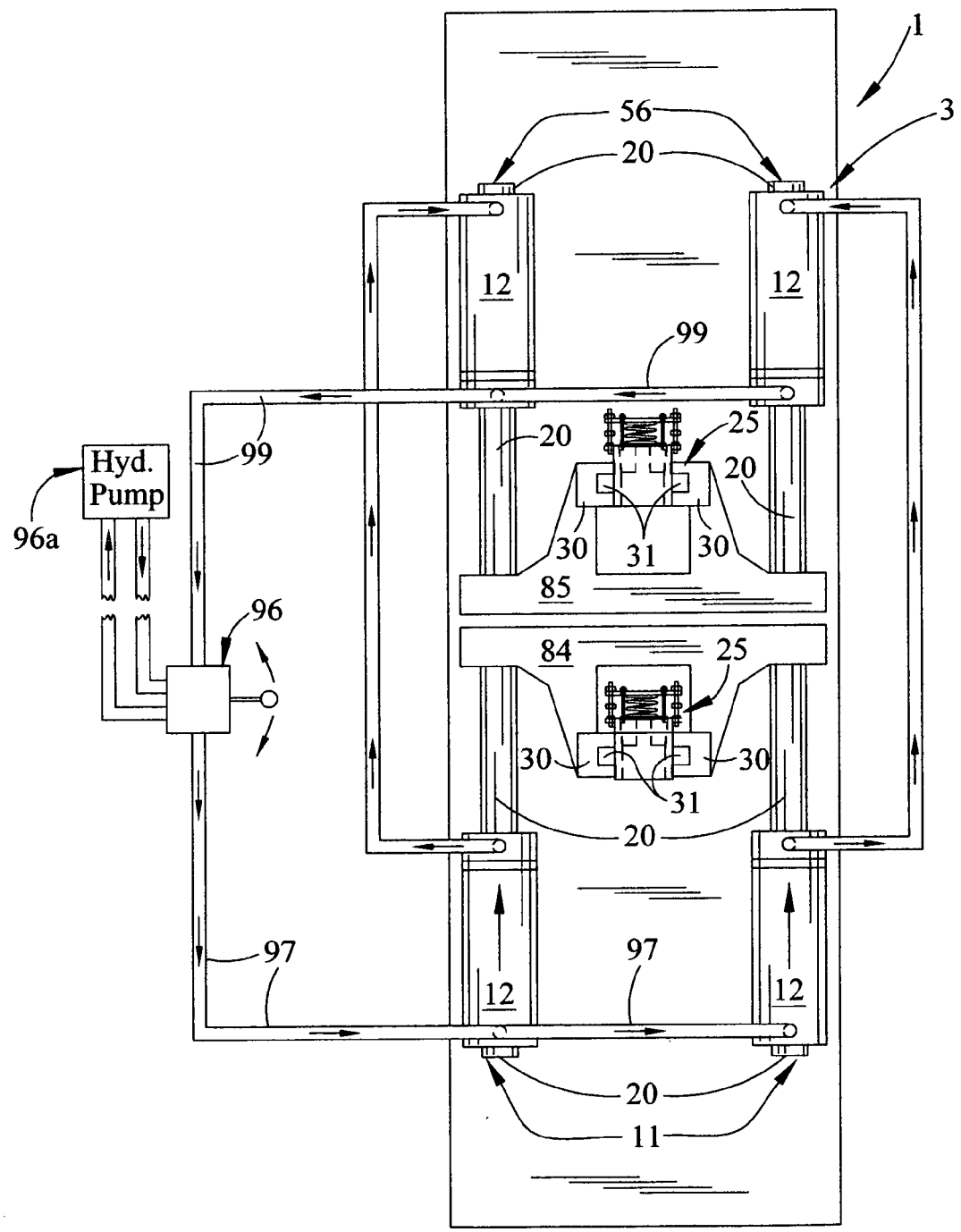
FIG. 7 is a top view of the tandem apparatus illustrated in FIG. 1, more particularly illustrating a typical hydraulic pump reservoir and feed and return line system configuration for operating the dual, oppositely-disposed pairs of hydraulic cylinders.

Operation of the tandem apparatus 1 illustrated in FIGS. 1–4 of the drawings is effected by tandem, selectively alternating or simultaneous operation of the hydraulic cylinders 12 in the manner illustrated in FIGS. 5–7 of the drawings. Referring initially to FIGS. 5 and 6, pressurized hydraulic fluid (not illustrated) is introduced into the fluid chambers 14 of each of the parallel sets of hydraulic cylinders 12 in the front rod-driving members 11 and the rear rod driving members 56, through the respective front hydraulic fluid port 22 (FIG. 5). The hydraulic fluid applies pressure to the piston 19 to facilitate rearward displacement of the piston 19 in the fluid chamber 14 in the direction of the arrow. This action causes rearward extension of the piston rod 20 through the front end 11a, sealed by the front end O-rings 11b, and the end plate 13, sealed by the end plate O-rings 17, respectively, in the hydraulic cylinders 12. Reverse operation of the hydraulic cylinder 12 by entry of the hydraulic fluid into the rear hydraulic cylinder fluid port 22a (FIG. 5) effects a reverse movement of the piston 19 and the piston rods 20 in each of the hydraulic cylinders 12, in operation of the tandem apparatus 1. As illustrated in FIG. 7, the tandem apparatus 1 is typically operated by means of a hydraulic fluid system that includes a hydraulic pump 96a, that pumps hydraulic fluid from a hydraulic fluid tank 96, initially through a hydraulic feed line 97, to the hydraulic cylinders 12 of the front rod driving members 11, as illustrated in FIG. 5 and described above. This hydraulic feed effects extension of the corresponding front yoke 84 and associated gripping element 25 in the direction of the arrows. Hydraulic fluid also flows from the front rod driving members 11 hydraulic cylinders 12, to the dual hydraulic cylinders 12 of the rear rod driving members, 56 to extend the rear yoke 85 and the corresponding gripping element 25 in non-gripping sequence. The fluid then flows back into the hydraulic fluid tank 96 through the hydraulic fluid return line 99. The hydraulic fluid flow is then reversed to reverse the operation of the tandem apparatus described above.

Figure 9:
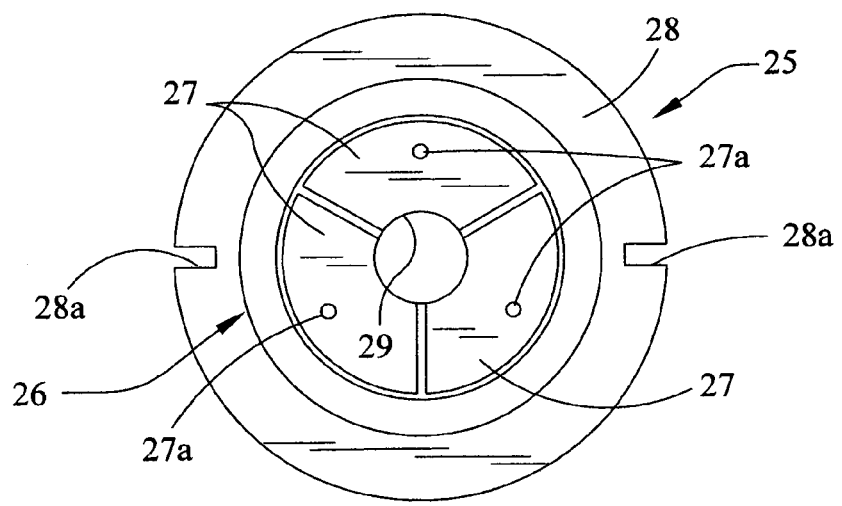
FIG. 9 is a sectional view taken along line 9—9 of the gripping device illustrated in FIGS. 8 and 12.

Referring now to FIGS. 8–11 of the drawings, in a preferred embodiment of the invention the two gripping elements 25 that receive the pull rod 40 or the pull cable 40*a* are each characterized by a cylindrical adaptor housing 26, having a cone-shaped internal top surface that houses three correspondingly-tapered wedges 27 (illustrated in phantom), each fitted with a set of unidirectional teeth 27*b* and a threaded wedge hole 27*a* in the top thereof, as illustrated in FIGS. 8, 9 and 12. A mount flange 28 encircles the adaptor housing 26 at the top thereof and a pair of diametrically-opposed mount flange slots 28*a* are provided in the mount flange 28, for purposes which will be hereinafter described. A rod or cable opening 29 is also provided in the centers of the cone-shaped wedges 27 at the point of convergence of the wedges 27 and the teeth 27*b*, as illustrated in FIG. 9, for receiving a pull rod 40 or a pull cable 40*a* (illustrated in phantom in FIGS. 8 and 12). The pull rod 40 or pull cable 40*a* also extends through the center of a gripping element spring 35, interposed between a bottom compression plate 37, positioned directly above the wedges 27, and a top compression plate 34, as further illustrated in FIG. 8 of the drawings. The top compression plate 34 includes three threaded stabilizing bolts 36, each having stabilizing bolt nuts 36*a* threaded thereon above the top compression plate 34, but normally not touching it. The bottom ends of each of the stabilizing bolts 36 are threaded into the corresponding threaded wedge hole 27*a* of a corresponding wedge 27, as further illustrated in FIG. 8. The top compression plate 34 is positioned on top of the gripping element spring 35 by means of two T-bolts 32, the T-bolt heads 32*c* of which are removably seated in corresponding mount flange slots 28*a*, provided in the mount flange 28. A top nut 32*a*, threaded on the upper end of each of the T-bolts 32, maintains a desired degree of tension in the gripping element spring 35. A bottom nut 32*b* is also threaded on each of the T-bolts 32, between the top compression plate 34 and the bottom compression plate 37, and a washer 33 is welded to each T-bolt 32, about one-eighth of an inch above the mount flange 28, to facilitate removal of the T-bolt heads 32*c* from the corresponding mount flange slots 28*a*. Accordingly, it will be appreciated from a consideration of FIG. 8 that a desired degree of tension can be applied to the gripping element spring 35 by adjusting the respective top nuts 32*a* on the corresponding T-bolts 32 and compressing the gripping element spring 35 between the top compression plate 34 and the bottom compression plate 37. This tension is also applied to the respective wedges 27 disposed beneath the bottom compression plate 37, to force the wedges 27 inwardly and downwardly along the cone-shaped interior wall of the adaptor housing 26, and engage the respective teeth 27*b* with the pull cable 40*a*.

As further illustrated in FIGS. 1 and 8–11, a housing mount 30 is mounted on each of the front yokes 84 and rear yoke 85 and is extended around a corresponding housing flange 31, attached to the adaptor housing 26, as illustrated in FIGS. 8, 10 and 11 of the drawings. The housing mount 30 receives the housing flange 31 in a housing mount slot 30*a* and serves to removably secure each gripping element 25 in position on the respective front yoke 84 and rear yoke 85 of the tandem rod and cable pulling apparatus 1, as further illustrated in FIG. 1 of the drawings.

Referring now to FIG. 12 of the drawings, in an alternative preferred embodiment of the gripping elements of the tandem apparatus 1, each gripping element 25 may be constructed using one or more rubber washers 38 interposed between the top compression plate 34 and the bottom compression plate 37, in place of the gripping element spring 35 illustrated in FIG. 8. The purpose of the rubber washers 38, like the gripping element spring 35, is to exert pressure on the bottom compression plate 37 and thus, the wedges 27, by tightening or loosening the respective top nuts 32*a* on the corresponding T-bolts 32, to exert the desired degree of force on the respective wedges 27.

Figure 13:
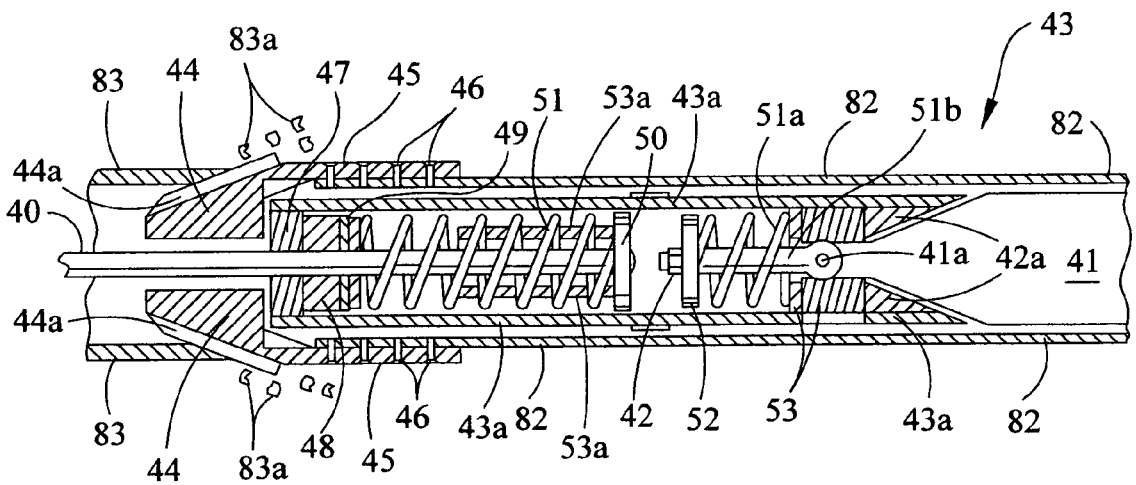
FIG. 13 is a sectional view of a preferred embodiment of the bursting and stored energy head and hammer components of the tandem apparatus of this invention.

Referring to FIG. 13 of the drawings a preferred bursting and stored energy head 43 is illustrated for use in the tandem apparatus 1 of this invention. The bursting and stored energy head 43 includes a cylindrical bursting head housing 43*a*, fitted into a wedge sleeve 45, having an expander or pipe bursting wedge 44 and knives 44*a* on the end thereof. The wedge sleeve 45 is attached to a replacement pipe 82, typically by means of suitable pipe connectors 46, such as lag screws, such that the replacement pipe 82 is continuously pulled forward by advancement of the bursting and stored energy head 43, responsive to the tension applied to the pull rod 40 (or a pull cable, not illustrated), in the manner hereinafter described. An end plate 47 is provided in the forward end of the bursting and stored energy head housing 43 adjacent to the expander wedge 44 and a rubber disc 48 is positioned adjacent to the end plate 47, as further illustrated in FIG. 13. A front plate washer 49 is positioned against the rubber disc 48, such that the rubber disc 48 is interposed between the end plate 47 and the front plate washer 49 and a rear plate washer 50 is slidably disposed inside the bursting head housing 43*a* and is attached to the extending end of the pull rod 40 (or the pull cable), as the case may require. A front spring 51 is interposed between the rear plate washer 50 and the front plate washer 49 and a spring stop 53*a* is typically secured to the rear plate washer 50 and extends inside the coils of the front spring 51, to limit the tension applied to the front spring 51 and thus extend the life of the front spring 51, as the free end of the spring stop 53*a* contacts the front plate washer 49, upon extreme tensioning of the front spring 51.

As further illustrated in FIG. 13, a rear spring 51*a* is positioned in the interior of the bursting and stored energy head housing 43*a*, rearwardly of the front spring 51 and is maintained in this position by a rear spring washer 52, seated on a rear spring rod 51*b* and maintained in position by a nut 42. The opposite end of the rear spring rod 51*b* is secured to a hammer 41 by means of a hammer pin 41*a*, and a rear spring seat 53 receives the opposite end of the rear spring 51*a* from the rear spring washer 52. A tapered hammer seat 42*a* is shaped in the bursting head housing 43*a* rearwardly of the rear spring seat 53 and corresponds in shape to the tapered end of the hammer 41, as further illustrated in FIG. 13.

In operation, and referring again to the drawings, the tandem apparatus 1 is used to pull a bursting and stored energy head 43 through a pipe 83 and break the pipe 83 into pipe fragments 83*a* using a pull rod 40 or a pull cable 40*a*, as follows. The pull rod 40 or the pull cable 40*a* is extended through the rod or cable openings 29 of the aligned gripping elements 25, as illustrated in FIGS. 1–3 and 12 of the drawings, after extension through the rod or cable openings 4a provided in the end frame members 40, as further illustrated in FIG. 1. One end of the pull rod 4 is attached to a bursting and stored energy head 43, as illustrated in phantom in FIG. 1 and in FIG. 13. In a preferred embodiment of the invention, the pull rod 40 is secured to the bursting and stored energy head 43 illustrated in FIG. 13 by projecting the pull rod 40 through the center opening located in the expander wedge 44, and then through corresponding, aligned openings (not illustrated) provided in the end plate 47, rubber disc 48, and front plate washer 49. The pull rod 40 is further extended through the interior of the front spring 51 and the spring stop 53a and finally through the rear plate washer 50, where it is attached by a bolt or any suitable means as further illustrated in FIG. 13. Under circumstances where a cable (not illustrated) is used instead of the pull rod 40 for coupling to the bursting and energy head 43, a segment of the pull rod 40 may be installed on the rear plate washer 50 in the manner described above and the cable attached to the extending end of the pull rod 40 by an I-bolt or other suitable means. When the pull rod 40 is extended through the aligned gripping elements 25 as illustrated in FIG. 1 of the drawings, the pull rod 40 projects through the rod or cable openings 29 provided in the respective wedges 27 and through either the gripping element spring 35 illustrated in FIG. 8, or a corresponding opening (not illustrated) provided in the rubber washers 38, as illustrated in FIG. 12. In each case, the teeth 27b of the wedges 27 in each of the gripping elements 25 are pressed against the pull rod 40 by operation of the bias in either the gripping element spring 35 illustrated in FIG. 8, or the rubber washers 38, illustrated in FIG. 12.

The tandem apparatus 1 illustrated in FIGS. 1–3 and FIG. 7 is now ready for operation to pull the bursting and stored energy head 43 through the pipe 83 and locate the replacement pipe 82 in the place of the pipe 83, as illustrated in FIG. 13. Accordingly, the tandem apparatus 1 is operated as heretofore described with respect to FIGS. 5, 6 and 7 to incrementally force the pull rod 40 through the tandem apparatus 1 and pull the bursting and stored energy head 43 through the pipe 83 to break the pipe 83 and replace it with the replacement pipe 82.

Referring again to FIG. 13 of the drawings, as tension or force is applied to the pull rod 40, the front spring 51 is compressed in the bursting and stored energy head 43. Additional force applied to the pull rod 40 also compresses the rubber disc 48, as the spring stop 53a contacts the front plate washer 99 that overlays the rubber disc 48. This compression causes the rubber disc 48 to enlarge and seal the bursting head housing 43a against the intrusion of water and debris in the pipe 83. While the front spring 51 is so compressed, the hammer 41 is operated to strike the hammer seat 42a in the bursting head housing 43a, using the tension in the rear spring 51a, which is also compressed as the hammer 41 is withdrawn from the hammer seat 42a, for striking. Successive hammer strikes, coupled with the forward forces created by the tension in the front spring 51 and the rear spring 51b, enhance the progress of the bursting and stored energy head 43 through the pipe 83.

It will be appreciated from a consideration of FIGS. 1–3 of the drawings that under circumstances where a pull rod 40 is used to operate the bursting and stored energy head 43, the front driving members 11 and the rear driving members 56 can be operated intermittently and alternatively as described above, by engaging one respective set of hydraulic cylinders 12 at a time in the exertion of pressure on the pull rod 40. In another mode, all hydraulic cylinders 12 can be operated simultaneously in a common pulling direction to exert even greater force on the pull rod 40, when one of the gripping elements 25 is reversed in the corresponding housing mount 30. In the latter case, under circumstances where the bursting and stored energy head 43 encounters an exceptionally resistant structure such as a concrete casement, timber, valve or the like, the tandem apparatus 1 can be manipulated to facilitate a common pulling of both the front rod driving members 11 and the rear rod driving members 56 together, with both of the gripping elements 25 engaging the pull rod 40 simultaneously to achieve this result. However, it is understood that while the strength and pulling force on the pull rod 40 is doubled in this configuration, the speed of advancement of the bursting and stored energy head 43 is only half as fast as the advancement in the intermittent and alternative sequence described above.

It will be further appreciated by a consideration of FIGS. 1–3 of the drawings that under circumstances where the pull rod 40 is utilized in the tandem apparatus 1, the operating end of the pull rod 40 can be attached to the rear of the bursting and stored energy head 43 in any suitable manner, to push the bursting and stored energy head 43 through the pipe 83, instead of pulling it, as described above. Furthermore, while oppositely-disposed sets of the hydraulic cylinders 12 are preferred for operating the tandem apparatus, additional hydraulic cylinders 12 can be attached to the respective front yoke 84 and rear yoke 85 (FIG. 1), as deemed necessary and convenient. Moreover, while a hydraulic system is preferred as described above, in some applications a pneumatic system may be used, wherein the fluid-operated cylinders are typically operated by air pressure.

Accordingly, while the preferred embodiments of the invention have been described above, it will be recognized and understood that various modifications may be made in the invention and the appended claims are intended to cover all such modifications which may fall within the spirit and scope of the invention.

What is claimed is:

1. An apparatus for pulling an elongated operating member attached to a bursting and stored energy head through a pipe, said apparatus comprising oppositely-disposed sets of fluid cylinders and a spring-operated, linearly-aligned gripping element connected to each of said sets of fluid cylinders, said gripping element comprising a housing having a tapered bore; an articulating wedge slidably disposed in said tapered bore of said housing for engaging the operating member, said articulating wedge operable for positioning in a first position in said tapered bore wherein said articulating wedge grips the operating member and a second position in said tapered bore wherein said articulating wedge releases the operating member; a first compression plate carried by said articulating wedge, bias means disposed against said first compression plate for biasing said articulating wedge in said first position, and a second compression plate engaging said bias means for selectively adjusting pressure against said bias means.

2. The apparatus of claim 1 wherein said articulating wedge comprises at least three wedge segments disposed in said tapered bore.

3. The apparatus of claim 1 comprising a yoke connected to each of said sets of fluid cylinders, respectively, said yoke also adapted to engage said gripping element, respectively, for selectively shifting said gripping element and said articulating wedge forwardly and rearwardly on said operating member to grip and release said articulating wedge on the operating member and pull the operating member and the bursting and stored energy head through the pipe.

4. The apparatus of claim 3 wherein said articulating wedge comprises at least three wedge segments disposed in said tapered bore.

5. The apparatus of claim 1 wherein said elongated operating member comprises a cable.

6. The apparatus of claim 5 comprising a yoke connected to each of said sets of fluid cylinders, respectively, said yoke also adapted to engage said gripping element, respectively, for selectively shifting said gripping element and said articulating wedge forwardly and rearwardly on said cable to intermittently grip and release said articulating wedge with the cable and pull the cable and the bursting and stored energy head through the pipe.

7. The apparatus of claim 6 wherein said articulating wedge comprises at least three wedge segments disposed in said tapered bore.

8. The apparatus of claim 1 wherein said elongated operating member comprises a rod.

9. The apparatus of claim 8 comprising a yoke connected to each of said sets of fluid cylinders, respectively, said yoke also adapted to engage said gripping element, respectively, for selectively shifting said gripping element and said articulating wedge forwardly and rearwardly on said rod to grip and release said articulating wedge with the rod and selectively push and pull the rod and the bursting and stored energy head through the pipe.

10. The apparatus of claim 9 wherein said articulating wedge comprises at least three wedge segments disposed in said tapered bore.

11. The apparatus of claim 1 wherein said oppositely-disposed sets of fluid cylinders comprises oppositely-disposed pairs of fluid cylinders and said bias means comprises a coil spring.

12. The apparatus of claim 11 wherein said articulating wedge comprises at least three wedge segments disposed in said tapered bore; and comprising a yoke connected to each of said pairs of fluid cylinders, respectively, said yoke also adapted to engage said gripping element, respectively, for selectively shifting said gripping element and said articulating wedge forwardly and rearwardly on said operating member to grip and release said articulating wedge on the operating member and pull the operating member and the bursting and stored energy head through the pipe.

13. The apparatus of claim 1 wherein said oppositely-disposed sets of fluid cylinders comprises oppositely-disposed pairs of fluid cylinders and said bias means comprises at least one resilient washer.

14. The apparatus of claim 13 wherein said articulating wedge comprises at least three wedge segments disposed in said tapered bore; and comprising a yoke connected to each of said pairs of fluid cylinders, respectively, said yoke also adapted to engage said gripping element, respectively, for selectively shifting said gripping element and said articulating wedge forwardly and rearwardly on said operating member to grip and release said articulating wedge on the operating member and pull the operating member and the bursting and stored energy head through the pipe.

15. An apparatus for pulling a cable underground, said apparatus comprising first and second pairs of fluid cylinders; a pair of gripping elements carried by said pairs of fluid cylinders, respectively, each of said gripping elements comprising a housing having a tapered bore for receiving the cable; a plurality of articulating wedges slidably disposed in said tapered bore between a first position for gripping the cable and a second position for substantially releasing the cable; a first compression plate carried by said housing; a second compression plate carried by said plurality of articulating wedges; and a bias mechanism disposed between said first compression plate and said second compression plate, said bias mechanism normally biasing said articulating wedges in said first position, wherein said pairs of fluid cylinders selectively and intermittently pull said gripping elements and the cable underground as the cable is intermittently gripped and released by said plurality of articulating wedges, respectively.

16. An apparatus for use with a rod pulling mechanism for pulling and pushing a rod underground, said apparatus comprising a pair of oppositely-disposed pairs of fluid cylinders; a pair of spring-loaded gripping elements carried by said pairs of fluid cylinders, respectively, each of said gripping elements comprising a housing having a tapered bore for receiving the rod; a plurality of articulating wedges slidably disposed in said tapered bore between a first position for gripping the rod and a second position for substantially releasing the rod; a plurality of bolts carried by said housing; a first compression plate carried by said plurality of bolts; a plurality of stabilizing bolts carried by said plurality of articulating; a bottom compression plate carried by said plurality of stabilizing bolts; a bias mechanism disposed between said first compression plate and said second compression plate, said mechanism biasing said plurality of articulating wedges in said first position, wherein said pairs of fluid cylinders in the cable pulling mechanism selectively pull and push said spring-loaded gripping elements and the rod as the rod is gripped and released by said articulating wedges.

17. An apparatus for pulling a bursting and stored energy head through a pipe comprising a rod or cable for connection to the bursting and stored energy head; two pairs of tandem-mounted rod-driving members disposed in oppositely-disposed relationship with respect to each other; and a pair of gripping elements provided on said pairs of tandem-mounted rod-driving members, respectively, said gripping elements disposed in aligned relationship with respect to each other on said rod or cable for alternately gripping, pulling and releasing said rod or cable responsive to operation of said sets of tandem-mounted rod-driving members and each of said gripping elements comprising a housing, a plurality of articulating wedges provided in said housing, a first compression plate carried by said housing, a second compression plate carried by said articulating wedges and a coil spring interposed between said first compression plate and said second compression plate for selectively exerting pressure against said articulating wedges responsive to movement of said first compression plate against said coil spring.

18. The apparatus of claim 17 comprising a yoke for receiving each of said pairs of tandem-mounted rod-driving members and said gripping elements, respectively, and wherein said pairs of tandem-mounted rod-driving members each comprises a pair of hydraulic cylinders carried by said yoke, respectively, and a piston slidably disposed in each of said hydraulic cylinders, with said piston connected to said yoke, respectively, for alternately gripping, pulling and releasing said rod or cable.

* * * * *